H. O. Richardson INVENTOR

Patented Sept. 18, 1945

2,385,162

UNITED STATES PATENT OFFICE 2,385,162

CHEMICAL APPARATUS FOR THE MANUFACTURE OF EXPLOSIVES

Hubert Osborn Richardson, Washburn, Wis., assignor to E. I. du Pont de Nemours & Company, Wilmington, Del., a corporation of Delaware Application February 25, 1942, Serial No. 432,277

1 Claim. (Cl. 209—235)

This invention relates to chemical apparatus for the manufacture of explosives.

In the manufacture of trinitrotoluene and other crystalline explosive compounds, difficulties are encountered in the handling of the freshly made material, especially during purification. The apparatus employed in the prior art in this connection has not been satisfactory in many respects.

The object of this invention is an improved chemical apparatus for the refining of explosives. A further object is an improved apparatus and process for the refining of trinitrotoluene and other crystalline chemical compounds, explosive and otherwise. Additional objects will be noted from the following detailed description of the invention.

The foregoing disadvantages are overcome and the objects obtained according to this invention, by passing a slurry of trinitrotoluene containing undesirable pellets, through a pipe, causing the slurry stream to fall from the mouth of the pipe against a conical deflector element which deflects the slurry outwardly through a wire frustum, the pellets rebounding to fall back within the frustum, to the base thereof and out an exit disposed there, into a pellet box. The slurry passing through the frustum is caught in a drum containing the frustum and exits from the bottom of said drum. The pellet-free slurry which comprises crystalline trinitrotoluene suspended in sodium sulfite solution then passes into a filter vessel. The liquid is filtered therefrom to produce a filter cake, the cake is washed and more water introduced with agitation to re-slurry the trinitrotoluene and the new slurry is discharged, preferably to a melter.

Figure 1:
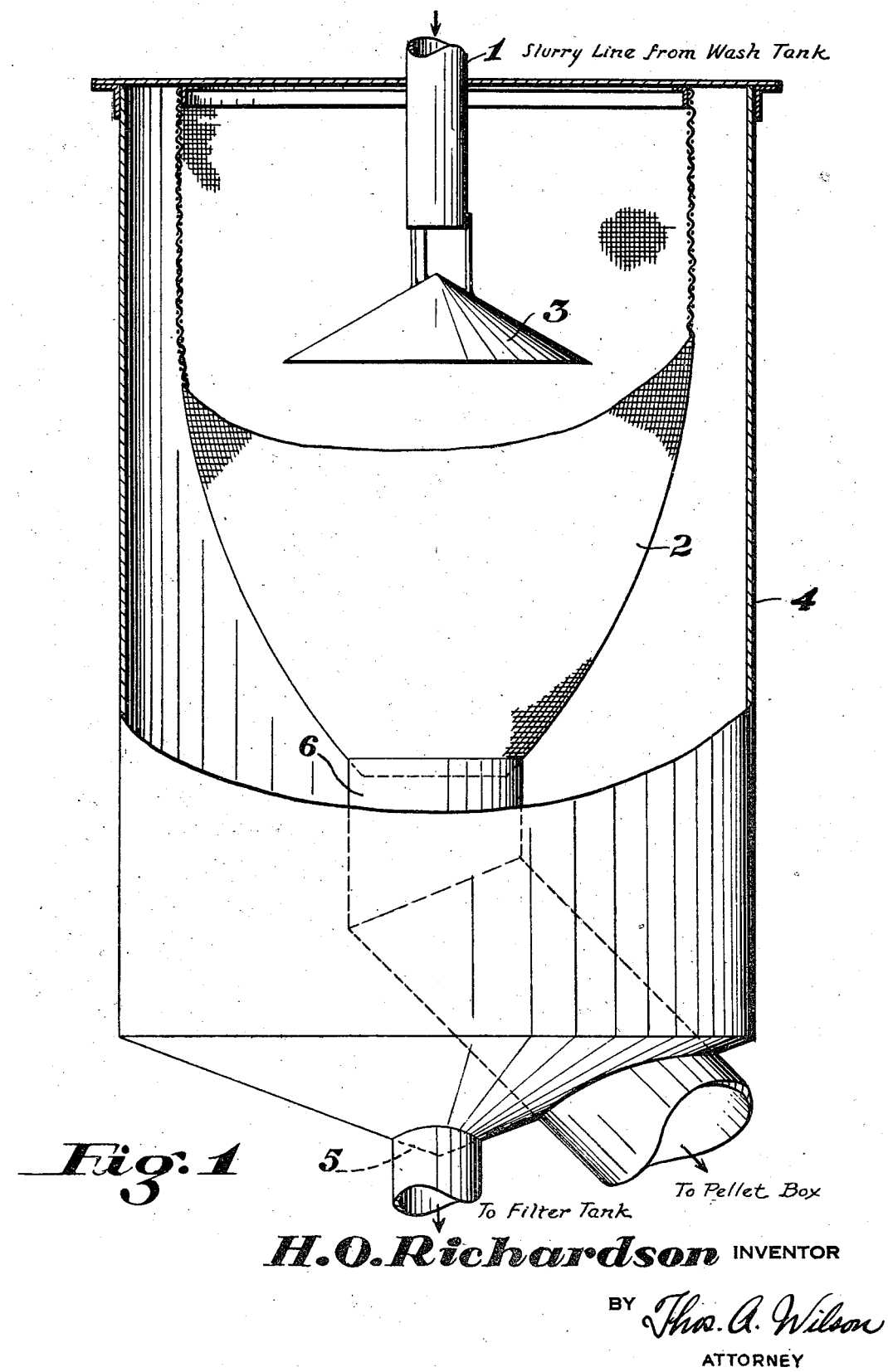
Figure 2:
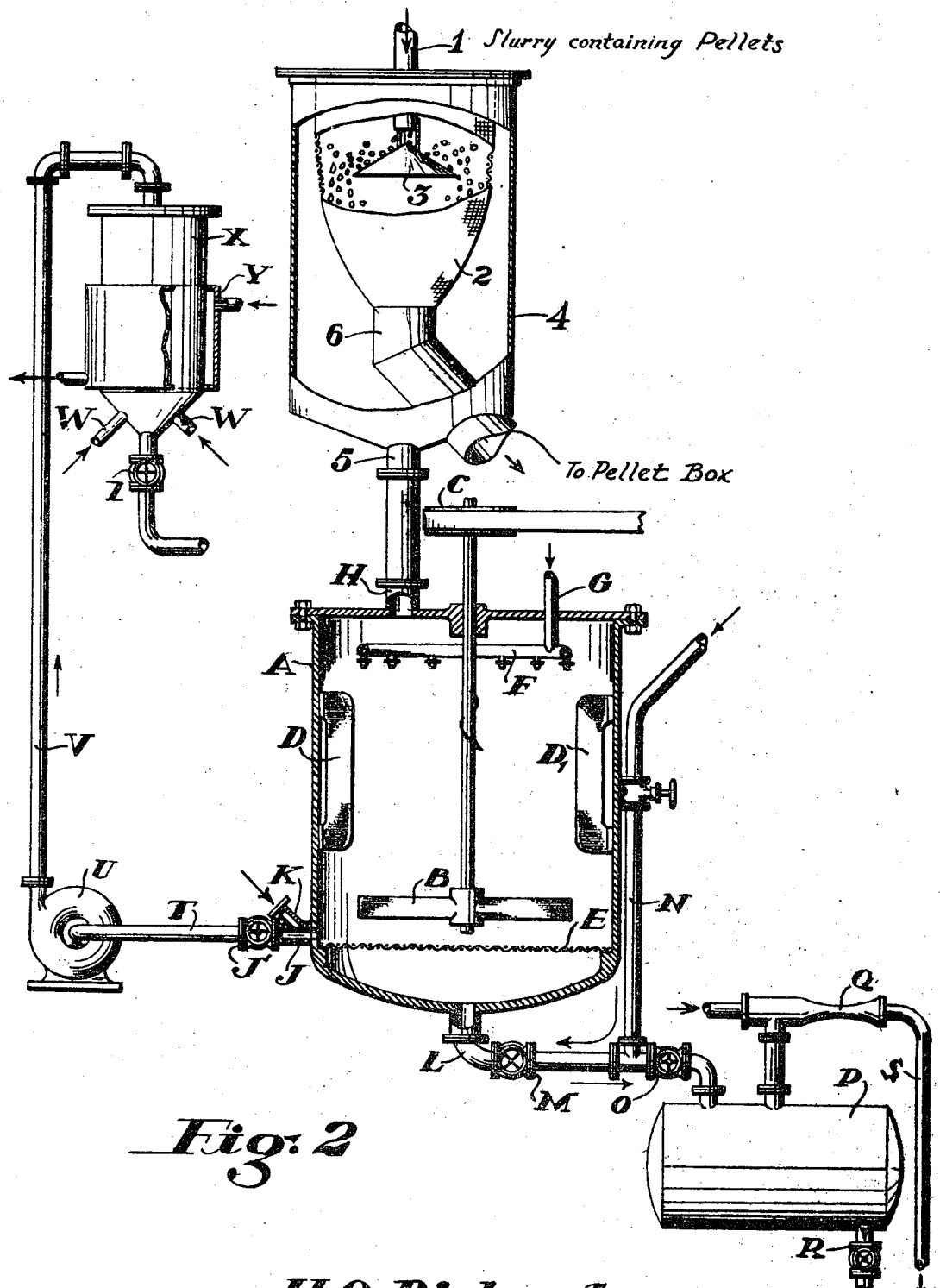

The invention may be more readily understood by referring to the accompanying drawings which represent a specific embodiment thereof. Figure 1 is a view of the depelletor. Figure 2 is a view in cross-section of the depelletor connected with the other apparatus.

Referring to Figure 1, the depelletor includes the slurry conduit 1, which extends within the wire frustum or screen 2. Beneath the mouth of the conduit and within the screen, is the conical deflector 3. The container 4 surrounds the screen to collect the slurry and is provided with outlet 5. At the base of the screen is the pellet exit 6.

Referring in greater detail to Figure 2, the steel filter tank A is fitted with a fine mesh wire filter cloth E near the bottom thereof, said cloth being suitably reinforced on both sides. Within the tank is the agitator B of the flat paddle type which is located above and adjacent to the filter cloth. The tank is provided with baffles D to promote turbulence during agitation. Spray nozzles are provided at F for the introduction of water supplied at conduit G. Inlet H is provided for the introduction of the slurry to be filtered. Near the bottom of the tank and above the filter cloth E is the outlet J and valve J' for the discharging of the refined slurry. There is also the small water inlet K cooperating with the outlet J for the removal of crystalline material which may obstruct J. Beneath the filter cloth is the outlet L for removal of filtrate and introduction of water entering through line N. The receiving tank P is connected to tank A through valves O and M. The melter tank X is connected to outlet J of tank A, through conduit T and pump U.

The process comprising the preferred embodiment of the invention may be described as follows: Crude molten trinitrotoluene obtained from nitration and containing some free acid is given several hot water washes to remove said acid. It is then crystallized, preferably under water, as described in copending applications Serial Number 312,354, Knake case 1, filed January 4, 1940, and Serial Number 364,031, Olsen case 1, filed November 2, 1940. The crystalline material is treated with sodium sulfite solution to remove undesirable isomers. The slurry of trinitrotoluene in sodium sulfite solution is pumped through the screening stationary depelletor to remove the large pumps. In this device the slurry enters the screening device through the conduit 1, strikes the deflector 3 and is thrown outward through the screen 2 into the containing tank 4. The pellets strike the sides of the screen and drop to the opening 6 in the bottom thereof and are removed through the conduit shown. The screened slurry leaves the tank through exit 5 and is then introduced into the filter tank A through inlet H. The sodium sulfite liquor containing dissolved sodium salts of the isomers is then separated from the granular refined trinitrotoluene by filtration through the filter cloth E, the liquor flowing on through the bottom outlet L into receiving tank P. To facilitate filtration, suction is employed beneath the filter cloth by means of the vacuum jet O. The liquor is subsequenly removed from the tank P through outlet R.

The cake of crystalline material wet with liquor remains on the filter. To remove the liquor, the cake is washed with water introduced through inlet G and spray nozzles at F. This wash water passes through the cake and filter cloth and through outlet L. When the washing is complete the valve Q, on receiving tank P, is closed and water introduced through line N into the bottom of the filter. This water causes the cake of trinitrotoluene to be lifted off the filter cloth. At this time the rotation of agitator B is started by a suitable driving means, such as pulley C, and water is introduced through the spray nozzles at F. By means of the water sprays and the agitation, a water slurry of the refined trinitrotoluene is produced. To facilitate the formation of this slurry it may be desirable also to introduce water through additional jets which may be provided at convenient positions around the side of the tank close to the filter cake. Usually a satisfactory slurry is formed when the mixture contains from 40-50% of solids. This water slurry is then allowed to discharge through outlet J, by opening valve J', from which point it may flow to a receiving vessel or to a pump for delivery to other operations in the process; for instance, to an elevated melter tank X by way of conduits T and V. In the melter the slurry is heated by means of the steam jacket Y. Also live steam may be introduced into the material through inlets W to facilitate the melting operation and to provide agitation. When the trinitrotoluene is entirely melted the charge is allowed to settle, whereupon a layer of trinitrotoluene forms on the bottom and the water layer forms on top. The lower layer of molten trinitrotoluene is drawn out through the bottom outlet Z into the drying tank, where moisture is removed. The melt may then be flaked or crystallized as desired.

Although the invention has been described in the foregoing with respect to the refining of trinitrotoluene it will be appreciated that the process and apparatus of the invention are applicable as well to the refining or filtering of any material.

The invention is particularly advantageous for the treatment of materials which are explosive per se, such as trinitrotoluene, trimethylene trinitramine, and pentaerythritol tetranitrate, or for the treatment of materials which cannot be adapted to manual operations because of toxicity.

The process of filtering the slurry to form a filter cake washing, and reslurrying with water and agitation is not claimed as part of the present invention independently, but this broad process and the portion of the apparatus employed therewith is claimed broadly in copending application of Acken and Olsen, Serial No. 395,710, filed May 29, 1941. My invention on the other hand involves these steps only in combination with the operation of my screening device including the deflector and wire frustum.

The invention is limited only by the following patent claim:

A continuous wet screening process for water-insoluble explosive compounds from the class consisting of trinitrotoluene, trimethylene trinitramine, pentaerythritol tetranitrate, which comprises forming an aqueous slurry of said material, said slurry containing pellets and solid suspended particles forcing said slurry from the mouth of a conduit against a conical deflector to deflect said slurry stream through a wire screen in the form of a frustum laterally enclosing said deflector, thereby causing any pellets to be removed from the slurry and fall to the base of said wire frustum, and continuously removing the pellet-free slurry by means of a tank surrounding said frustum.

HUBERT O. RICHARDSON.

CERTIFICATE OF CORRECTION.

Patent No. 2,385,162. September 18, 1945.

HUBERT OSBORN RICHARDSON.

It is hereby certified that error appears in the printed specification of the above numbered patent requiring correction as follows: Page 1, second column, line 33, for "pumps" read --lumps--; line 50, for "subsequenly" read --subsequently--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.